(12) United States Patent
Kim et al.

(10) Patent No.: US 7,175,088 B2
(45) Date of Patent: Feb. 13, 2007

(54) TWO-DIMENSIONAL CODE HAVING SUPERIOR DECODING PROPERTY WHICH IS POSSIBLE TO CONTROL THE LEVEL OF ERROR CORRECTING CODES, AND METHOD FOR ENCODING AND DECODING THE SAME

(75) Inventors: Kyoung-Tae Kim, Haengdang-dong (KR); Dong-Jin Kwon, Seongnam-si (KR)

(73) Assignee: Inconlab, Inc, Gangnam (KR)

( * ) Notice: Subject to any disclaimer, the term of this patent is extended or adjusted under 35 U.S.C. 154(b) by 0 days.

(21) Appl. No.: 11/451,356

(22) Filed: Jun. 13, 2006

(65) Prior Publication Data

US 2006/0226229 A1    Oct. 12, 2006

Related U.S. Application Data

(62) Division of application No. 10/532,814, filed on Apr. 26, 2005.

(30) Foreign Application Priority Data

Oct. 31, 2002    (KR)    ...................... 10-2002-0066980

(51) Int. Cl.
*G06K 7/10*    (2006.01)

(52) U.S. Cl. ........................ 235/460; 235/454; 235/494
(58) Field of Classification Search ................ 235/460, 235/454, 494, 487, 462.09, 462.1
See application file for complete search history.

(56) References Cited

U.S. PATENT DOCUMENTS

| | | | | |
|---|---|---|---|---|
| 6,000,614 A | * | 12/1999 | Yang et al. .................. | 235/460 |
| 6,092,732 A | * | 7/2000 | Curry ......................... | 358/3.28 |
| 6,131,807 A | * | 10/2000 | Fukuda et al. .............. | 235/494 |
| 6,279,830 B1 | * | 8/2001 | Ishibashi .................... | 235/494 |
| 6,364,209 B1 | * | 4/2002 | Tatsuta et al. .............. | 235/494 |

* cited by examiner

*Primary Examiner*—Thien M. Le
*Assistant Examiner*—Edwyn Labaze
(74) *Attorney, Agent, or Firm*—Global IP Counselors, LLP

(57) ABSTRACT

Two-dimensional Code having superior decoding property which is possible to control the level of error correcting codes, and method for encoding and decoding the two-dimensional Code is provided. The two-dimensional code includes finding pattern area comprised finding patterns for discriminating the code area from whole image, timing pattern area comprised timing patterns for checking a position of data area from the whole code and positions of each cells of the data area, and data area inputted various kinds of data and decoding information of data itself.

3 Claims, 11 Drawing Sheets

300

A: Finding Pattern
B: Timing Pattern
C: Data Pattern

400

| 0 | 3 | 6 | 1 | 4 | 7 | 2 | 5 |
|---|---|---|---|---|---|---|---|
| 1 | 4 | 7 | 2 | 5 | 0 | 3 | 6 |
| 2 | 5 | 0 | 3 | 6 | 1 | 4 | 7 |

TWO-DIMENSIONAL CODE HAVING SUPERIOR DECODING PROPERTY WHICH IS POSSIBLE TO CONTROL THE LEVEL OF ERROR CORRECTING CODES, AND METHOD FOR ENCODING AND DECODING THE SAME

CROSS-REFERENCE TO RELATED APPLICATIONS

This application is a divisional application of U.S. patent application Ser. No. 10/532,814 filed on Apr. 26, 2005. The entire disclosure of U.S. patent application Ser. No. 10/532,814 is hereby incorporated herein by reference.

TECHNICAL FIELD

The present invention relates to a two-dimensional code having superior decoding property, and more particularly, possible to reduce an overhead in decoding processing and to have the superior decoding property under the environment of recognition failure or symmetric errors in codes.

Furthermore, the two-dimensional code in the present invention is possible to decode an index code and data directly, and to control the level of Error Correcting Codes (ECC) according to a user configuration of codes. And, it is possible to decode code data by using error correction codes of Reed-Solomon in spite of corruption of the code data.

RELATED ART

The barcodes are classified into one-dimensional and two-dimensional barcode according to prior arts. One-dimensional barcodes are arranged of the combination of white and black bars which are constituted in different widths. Two-dimensional barcodes are constituted to information data unit contained in the codes by matrix formation which is arranged of two-dimension, for example data matrix and QR codes. And PDF 417 code is constituted by piling up one-dimensional barcodes in the column direction.

FIG. 1 shows one-dimensional and two-dimensional barcode in the prior art.

The one-dimensional barcode which is mainly used to a conventional art has a restriction of a recording amount of code data. The first barcode illustrated in FIG. 1 shows one-dimensional barcode 101. The one-dimensional barcode can represent alphabets, figures or special characters to data. The other barcodes of one-dimensional, which are not showed to FIG. 1, are UPC (Universal Product Code), EAN (European Article Numbering), code 39, Interleaved 2 of 5, code 93, code 128, Plessey code, code 11 or Standard 2 of 5 codes.

The two-dimensional barcode is a plane formation which is constituted to arrange data by row (X-direction) and column (Y-direction), and superior to the one-dimensional barcode for enlarged recording amount of data. The general two dimensional barcode can records Korean alphabet, Chinese characters and a picture, and more superior to the one-dimensional barcode in reading and printing, etc.

The conventional two-dimensional barcodes are PDF-417 103, QR code 105 and Data Matrix 107, as examples.

PDF-417 103 is a multi-layer of two-dimensional code having a variable symbol length and height developed by Symbol Technologies Co. of the US in 1989, and is described at U.S. Pat. No. 5,304,786. The PDF-417 103 is able to contain a lot of data comparing with the conventional barcode and to have a function of correction and error checking so that it is appropriate for data file and it is able to read as the conventional linear laser scanner, linear CCD scanner and 2D CCD scanner. One of the symbol characters is constituted of four bars and four spaces, and a length of four bars and four spaces is 17X module. That is a reason why PDF-417 is named from. PDF-417 103 can read as a variable scanner and it is an open system so that any user can apply easily and conveniently.

QR code 105 is a two-dimensional code developed by Nippondenso Co. of Japan in 1994 and is described at U.S. Pat. No. 5,726,435. The QR code 105 is invented for fitting in a part of an automatic factory processing as meaning of Quick Response Code. At an upper left side of QR code's symbol 105 and a right and bottom of the upper left side, there are two small cutout symbols so it can be recognized and read the direction of the symbols rapidly. It is selected Reed-Solomon Algorism for error checking and correction and it is possible to make a choice with 3 kinds of levels. First level can check errors and correct 7%, second level can check errors and correct 15%, and third level can check errors and correct 30%.

Data matrix 107 is a matrix code developed on 1989. It is developed for increasing of the amount of the expressive data per symbol. A size of symbol can be 0.001~14 inches for one side. It could be a regular square by 1 inch for expressing 2334 alphanumeric characters or 500 numbers is expressed by a dot matrix printer and by 1.4 inch for all 500 ASCII. Data Matrix has two kinds of symbols of ECC000-140 and ECC200 according to error checking and correction algorism. ECC000-140 is selected convolution error checking and correction algorism and ECC200 is selected Reed-Solomon algorism.

Reed-Solomon code is a code of a large group type suggested by Reed and Solomon and a kind of BCH. A Magnetic tape or damage on disk surface or dust is caused to make errors but if RS (Reed-Solomon) code is applied, the errors can correct. Reed-Solomon code can be expressed by correcting perfectly the error of 8 bites if adding 16 bites when input is 188 bites. And the Reed-Solomon can strongly remove the channel errors for using at the universe or a satellite communication, a satellite broadcasting, which are occurred sporadic errors and a large group errors at the same time as connecting to Convolution Code having superior ability of correction against the sporadic errors, such like a superior character of error correction of a large group. It is applied for a medium of the errors' correction such as a CD and digital recorder (DAT), a computer memorial device, a communication system for larger-expending and selected as a standard transferal at DVB (Device Video Broadcast).

However, the conventional art is impossible to be decoding in case the data at a barcode has a seriously damage. And cannot solve the overhead problem occurred when decoding. So the conventional art has a problem that it is impossible to decode in case of a falling-off in quality of images and a geometric transformation. Also it is not appeared a function for manufacturing of error correction value as the system or environment using kinds of barcodes because the ECC level is fixed and it is corresponded as a same error correction level.

DETAILED DESCRIPTION OF THE INVENTION

The present invention relates to a two-dimensional code, more specifically it is object to provide a two-dimensional code having superior decoding property. Also it is possible to reduce an overhead in decoding processing and to have the superior decoding property under the environment of recognition failure or symmetric errors in codes.

It is other object to provide a two-dimensional code being able to decode for serious data damage by using Reed-Solomon ECC (Error Correction Code), to adjust each of ECC levels according to use environment of a code of a user, and to decode directly of a dada and an index code.

To achieve the above object, there is provided a two-dimensional code comprises a finding pattern area includes finding patterns for discriminating a code area from whole image, a timing pattern area includes timing patterns for checking a position of data region and each cells in the data region from whole code image, and a data area recorded various kind of predetermined data and decoding information of data itself.

To achieve the above object, there is provided a method for encoding of the two-dimensional code comprises a step for inputting encoding-information objected to be encoded; a step for decision a number of each codeword according to said information; and a step for generating each codeword and a step for encoding data of the generated codeword.

To achieve the above object, there is provided a method for decoding of the two-dimensional code comprises a step of scanning for physically or electrically code image; a step of retrieving for finding pattern through said scanning; a step of analogically interpretation for slope of total code image through said retrieved finding pattern; a step of retrieving for timing pattern; a step of computing a position of the code through the retrieved timing pattern; a step of fine tuning for the computed position and slope of code; a step of extracting for grid coordinate in data area to use the coordinate formed by the each retrieved timing patterns; a step of extracting for bit patterns of the each grids extracted from the grid coordinate in data area; a step of extracting for code value from the extracted bit patterns; a step of extracting for codeword from the extracted code value; and a step of decoding for said extracted codeword.

BRIEF DESCRIPTION OF THE DRAWINGS

FIG. 8 shows a blocking diagram of encoded data.

DESCRIPTION OF PREFERRED EMBODIMENTS

Hereinafter describes an embodiment of the present invention.

Figure 1:
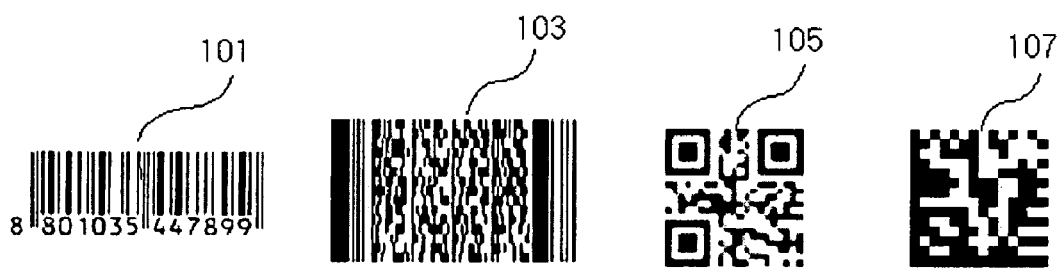
FIG. 1 shows barcode images in prior arts.
Figure 2:
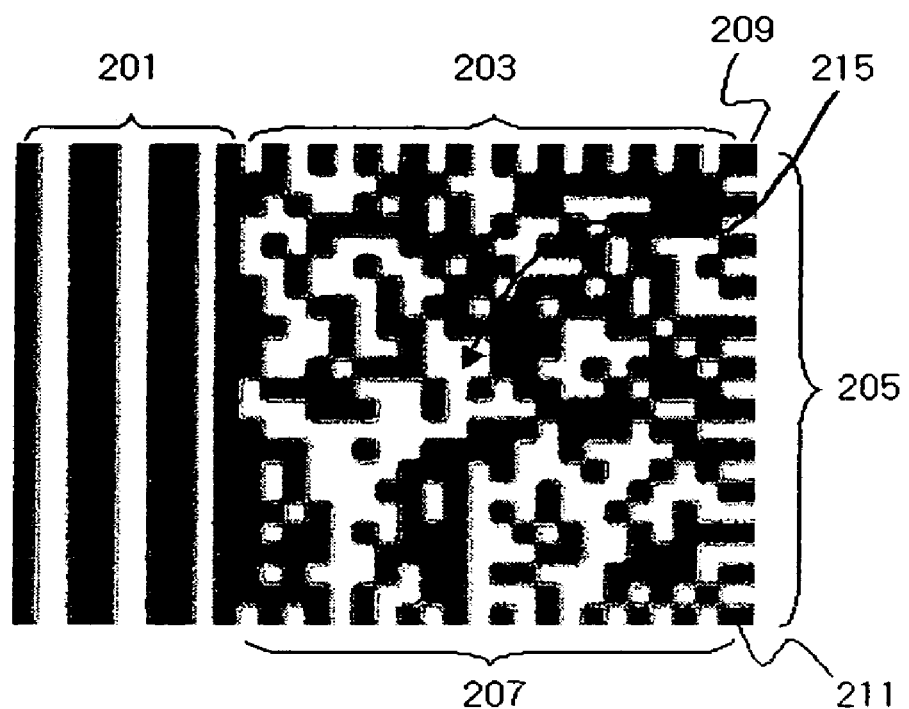
FIG. 2 shows an embodiment of two-dimensional code according to the present invention.

FIG. 2 shows an embodiment of two-dimensional code according to the present invention.

The two-dimensional code 200 showed in FIG. 2 comprises finding pattern 201, timing pattern 203 205 207 209 211 and coded data 215. Other embodiment of the two-dimensional code can comprise data 215 and finding pattern 201, except the timing pattern. And another embodiment of the two-dimensional code can comprise data 215 and timing pattern 203 205 207 209 211, except the finding pattern 201. But the best embodiment of the code 200 according to the present invention comprises data 215, finding pattern 201 and timing pattern 203 205 207 209 211, showed in FIG. 2.

Hereinafter describes a constitution and construction of the two-dimensional code, refer to FIG. 3.

Figure 3:
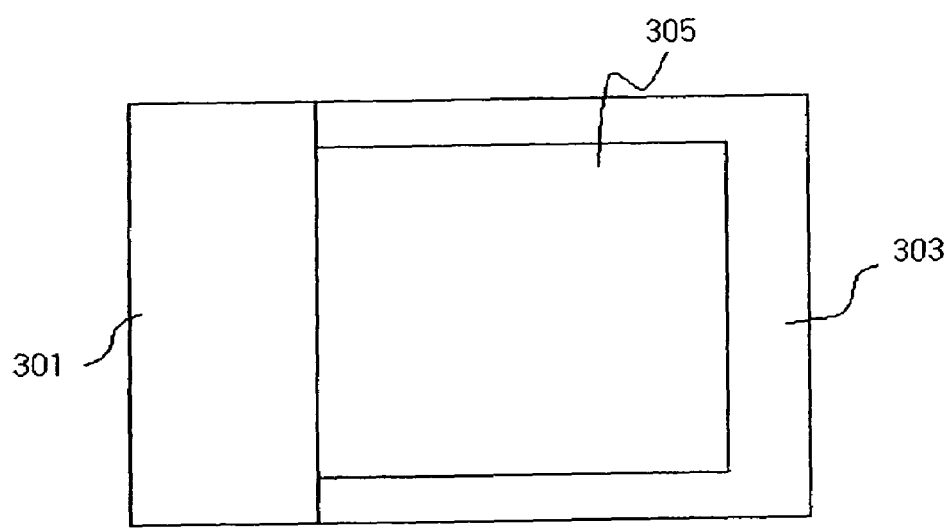
FIG. 3 shows an embodiment of a geometrical construction of the two-dimensional code according to the present invention.

FIG. 3 shows an embodiment of a geometrical construction of the two-dimensional code according to the present invention.

The preferred embodiment of the two-dimensional code comprises three areas, showed in FIG. 2. The three areas are a finding pattern area 301, timing pattern area 303 and data area 305.

1. Elements of Code (1) Finding Pattern Area 301

A code image may exist independently itself, but it is usual to recognize the code image with another noise images. So it is necessary to discriminate the code image, which is recognized by image recognition system like a scanner or camera, to another noise image from whole recognized image. The finding pattern 201 is a standard element which is discriminated the code image.

The left side in the total area of the code is placed on the finding pattern 201, which is the finding pattern area 301, showed in FIG. 2 and FIG. 3.

The finding pattern 201 comprised in the finding pattern area 301 reduces an overhead in decoding processing by discriminating the code area from whole acquired image more easily. So, it is possible to decode the code in low performance CPU system.

The finding pattern area placed in left-side showed in FIG. 3 is just an example of the present invention, and it is possible to change the location of the finding pattern area within the scope of the present invention. Other embodiments of the finding pattern area describe later, referring to FIG. 4.

(2) Timing Pattern Area 303

Referring to FIGS. 2 and 3, the timing pattern area 303, which includes timing pattern 203 205 207 209 211 for checking a position of data region and each cells in the data area, is located in top side, bottom side and right side of the whole code image, basis on data area 305.

The timing pattern 203 205 207 209 211 included in the timing pattern area 303 checks the data area 305 in the code 200, and more easily checks the position of each cells into the data area 305.

If degradation like a blurring or geometric distortion of image is occurred to the code image, it is impossible to decoding the code data or checking the position of cells. So, the timing pattern 203 205 207 209 211 is set up a predetermined area in the code, degradation of the code image does not prevent from decoding the code or checking the position of cells because of checking the position of each cells by the timing pattern 203 205 207 209 211. Moreover, decoding error for mirror image of the code is prevented and easily detection of printing error to the naked eye is possible, as each cells of top, bottom and right site of the timing pattern area 303 are comprised to different with one another.

(3) Data Area 305

The area surrounded with the finding pattern area 301 and timing pattern area 303, that is a center area of the code image 200, is a data area 305. The data area 303 comprises data patterns 215 which includes a various kind of predetermined data and decoding information of the data itself.

Each cell in data area 305 composes two colors of gray scale which one is a black having a value of 1 bit and the other is a white having a value of 0 bit. The encoded source information is figures, marks, alphabets, Korean alphabets, special characters, etc. The encoding processing comprises error-correction algorithm of Reed-Solomon (RS). And, the data area includes information related to the error-correction level of RS by means of BCH encoding. That is, the information included to the data area is coded data and the information of error correction level. Details related to the data describe later refer to FIG. 11.

The symbol image included to the various patterns exists on physical or electrical space, and a border of empty space surrounding the symbol can be further comprised to the code image.

The quiet zone is not showed in Fig. and generally allotted to "2X" module or more. The quiet zone is work for confirm the existence of the symbol by maintaining a signal level for a uniform time in case of reading the symbol.

The elements showed in FIG. 3 are just an example of the present invention, and the position of three areas is not limited to FIG. 3.

The position of the finding pattern 301 can be located in right side, top side or bottom side according to other embodiments of the present invention. It is possible to locate right and left, or top and bottom by divided. Other embodiments mentioned above show in FIG. 4 and FIG. 5.

Figure 4:
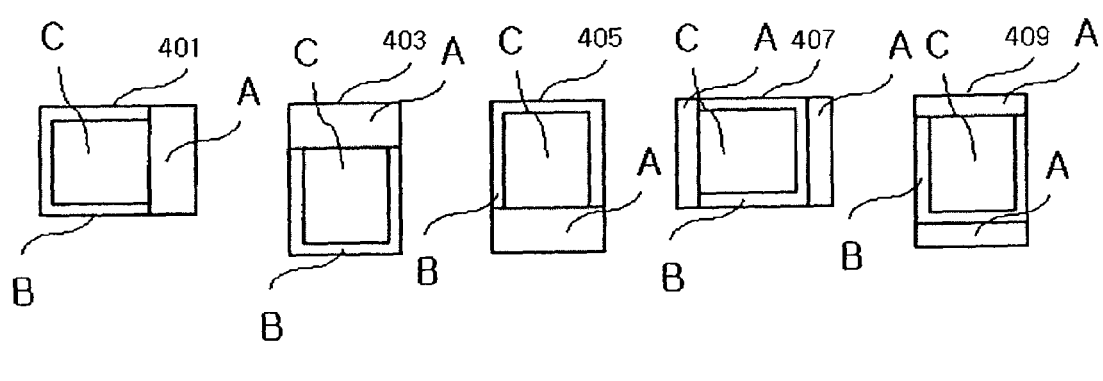
FIG. 4 shows deformation embodiments of two-dimensional code related to finding pattern.
Figure 5:
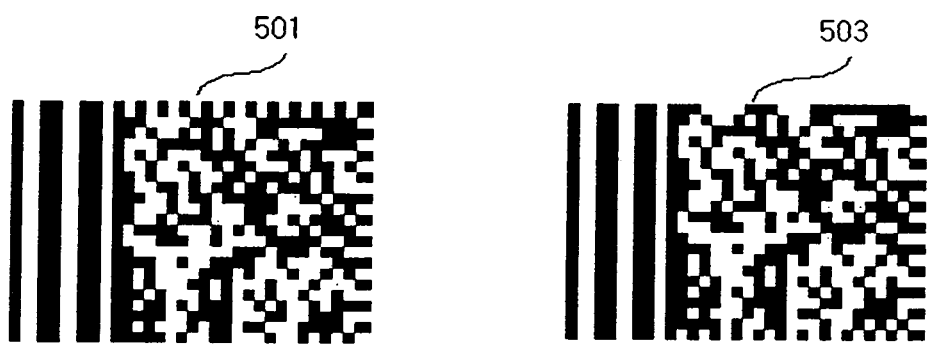
FIG. 5 shows deformation embodiments of two-dimensional code related to timing pattern.

FIG. 4 and FIG. 5 show deformation embodiments of two-dimensional code related to the finding pattern and timing pattern.

The finding pattern area A can be placed in right side of a code 401, top side of a code 403, bottom side of a code 405, divided left and right of a code 407, and divided top and bottom of a code 409, showed in FIG. 4. Even if the finding pattern area is comprised to a various embodiments like a FIG. 4, the finding patterns must comprise at least two thick bars for a function of the finding pattern itself in the code image.

The thick bar has a predetermined width which is recorded in a central position of the thick bar. So, the width of the thickness of the bar is properly at least 1.5 times or more as a unit size of cell. The unit size of cell is "2X" module. And width of the thick bar of the finding pattern is properly at least "3X" module.

The finding pattern can be performed its function in any case when the thick bar of the finding pattern is comprised to the code image at least two. That is related to a function of analogically interpretation for slope of total code image in finding pattern, and more details describe later refer to FIG. 10.

The timing pattern is not limited to FIG. 2 and FIG. 3. Other embodiments of change for timing pattern show in FIG. 5 like above finding patterns.

FIG. 5 shows an embodiment of that only one timing pattern is comprised on X-coordinate and Y-coordinate individually. That is, one case of two-dimensional code 501 which includes timing patterns on X-coordinate of top site and Y-coordinate of right site, and another case of two-dimensional code 502 which includes timing patterns on X-coordinate of bottom site and Y-coordinate of left site. Preferably, it is possible to comprise that two timing patterns are placed on anyone coordinate and one timing pattern placed on the other coordinate. So, the timing patterns can be comprised on three sides among four sides, and remain side among them comprises finding pattern. It is showed in FIG. 2.

But any one pattern or area can be emitted between finding patter and timing patter or areas. That is two embodiments. One is that a two-dimensional code comprises a finding pattern area includes finding patterns for discriminating a code area from whole image and located in any one-side or faced each other two-side of edge surfaces and a data area recorded various kind of predetermined data and decoding information of data itself. Where the finding patterns comprises a predetermined number of bars which are different from width with one another and sizes of at least two bars are 1.5 times or more as a unit size of cell. The other is that a two-dimensional code comprises a timing pattern area includes timing patterns for checking a position of data region and each cells in the data region from whole code image and a data area recorded various kind of predetermined data and decoding information of data itself. Where the timing pattern area includes at least one more row and column of edge surfaces in whole code plane, size and pattern of cells in each area are different from one another The best mode of the present invention is that the two-dimensional coed comprises a finding pattern area, timing pattern area and data area, showed in FIG. 3.

2. Geometrical Structure of Code

Hereinafter describes a geometrical structure of the two-dimensional code which is possible to control the level of error correcting codes according to the present invention, refer to FIG. 2.

Cells of each area of the code have a unit length and width which is defined to '2X'. So, the 2X means a unit length and width, hereinafter.

(1) Structure of Finding Pattern 201

The finding patterns 201 have a row structure of length and color of the code, 2X of black, 3X of white, 4X of black, 3X of white, 4X of black, 2X of white and 2X of white from left to right (row direction) direction in sequence. And the column structure of the finding of patterns 201 is a long bar.

The geometrical structure and patter of the finding patterns 201 can provide an image discrimination function whether the scanning code image is scanned in normal direction or in turn-over code image with 180° rotated, in raster scanning of decoding process. The turn-over code image with 180° rotated called a "upside down image", hereinafter. The discriminating of the upside down image is that, reading the finding patterns 201 scanned through raster scan, the reading value of the code structure is 2X, 2X, 4X, 3X, 4X,3X and 2X. So, it is known to the reading value of finding patterns that the scanned code image is an upside down image. So, the upside down image can by decoded in normal if the scanned image has a finding pattern 201.

(2) Structure of Timing Pattern 203, 205, 207, 209, 211

The timing pattern area comprises at least one more row and column of edge surfaces in whole code plane. According to FIG. 2, sizes of cells comprised of a top area 203, right area 205 and bottom area 207 are different from one another.

The cells of top area in timing patterns 203 is "2X (width)×3X (height)" structure, the cells of right area in timing patterns 205 is "3X×2X", and the cells of bottom area in timing patterns 207 is "2X×2X". And each cells 209 and 211 where a cross section area among the three areas 203, 205 and 207 are different from each other. The cell 209 is "3X (width)×3X (height)" and the cell 211 is "3X (width)× 2X (height)". Finally each cells of top area 203, right area 205, bottom area 207, cross section area 209 and 211 are comprises a different size with one another.

Whether a scanned code image is a mirror image, it is possible to normal decoding the scanned mirror image by comprising the timing patterns to the code. And it is easy to check the printed mirror image by naked eye that the error due to the mirror image can be corrected.

The geometric structure of finding pattern and timing pattern are not limited to the embodiments and FIG. 2. Other embodiments of the finding pattern and timing pattern are showed in FIG. 4 and FIG. 5.

(3) Pattern of Data Area

Cells in data area comprise same number of cell in row and column coordinate, according to an embodiment showed in FIG. 2. And the number of cells is odd number. The reason is that the timing patterns surrounded to data area are fit with each others. But different number of cells in data area can be comprised.

The smallest number of cells are 49, that is a value of 7 times 7, and the rational number of cells are 1681, that is a value of 41 times 41, in data area according to an embodiment of the present invention.

Figure 6:
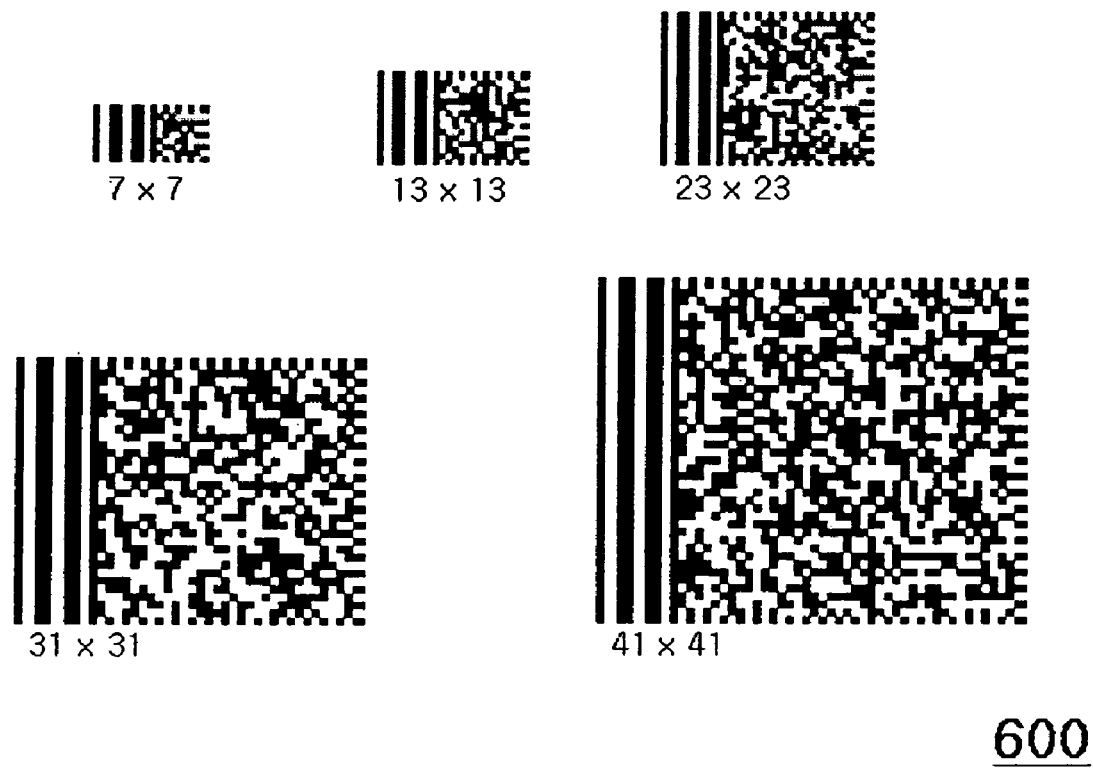
FIG. 6 shows a two-dimensional barcode according to a number of cells in data area.

FIG. 6 shows a two-dimensional barcode according to a number of cells in data area.

As the number of cells is increased in data area, an amount of information recorded to barcode also increase. But the decoding and reading the barcode is more difficult in case of increasing the amount of information in barcode. And it is necessary for the barcode reading and decoding system to construct high level configuration when the fixed barcode image have more recorded data. When the cell is increased in a fixed resolution, the barcode image is large in physical. Accordingly, the number of cells in data area can be selected properly to consider the condition of physical size in barcode image and the resolution of barcode reading system.

Hereinafter describes encoding of data.

An encoded data can be a figure, mark, Korean alphabets, Chinese alphabets, English alphabets, special characters, byte information, etc.

3. Encoding of DATA

Figure 7:
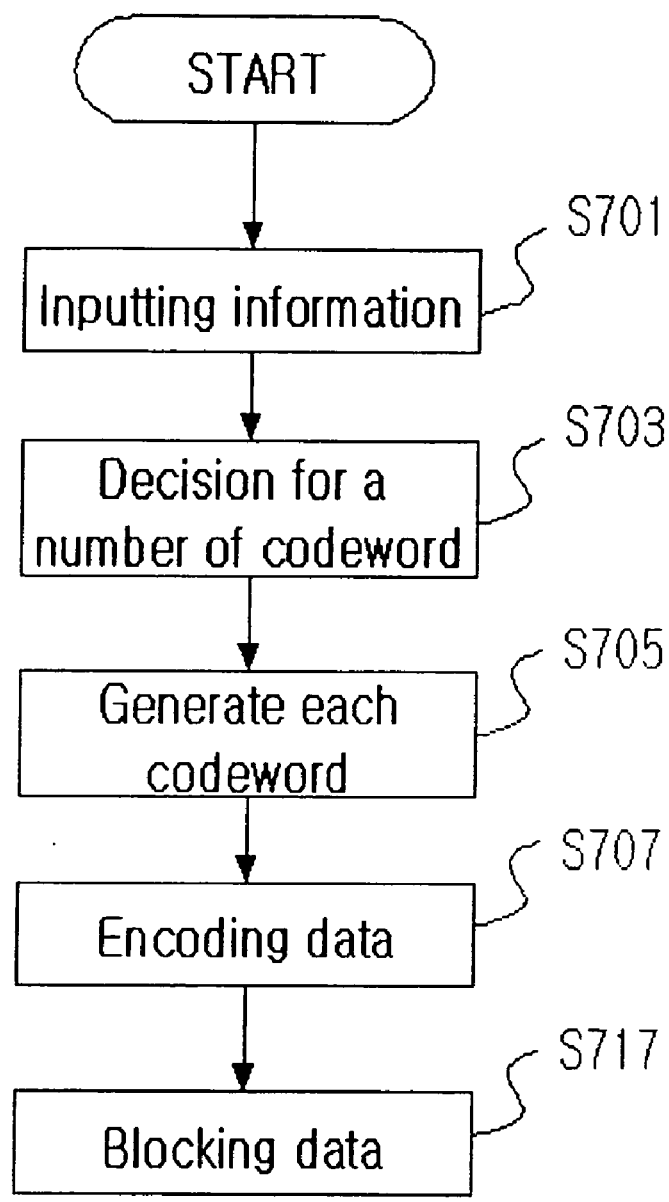
FIG. 7 shows a flow chart of encoding process from data to two-dimensional code.

FIG. 7 shows an encoding process of data to two-dimensional code.

First, input encoding information S701.

The encoding information can be a data to be encoded, size of cell and a level of error correcting codes.

Second step of S703 decides to a number of each codeword according to said information. The number of codeword is a total number of codeword, data codeword and Reed-Solomon (RS) codeword.

Third step of S705 is generates the each codeword to use above data and pad character.

The pad character is not effect to output character, which is a dummy value supplemented to an empty space except data.

Fourth step of S707 is encoding data.

The data encoding is started to an ASCII encoding mode, and encoded that continuous two figures are double density and Korean alphabet is Korean encoding mode. The Korean alphabet supports a 2350 number of complete type HANGUL according to the Rule of KSC 5601-1987, and encodes 12 bits per each character.

According to an appropriate embodiment of the present invention, a BCH code is supplemented to the data area of the code in case that total number of cell in data area are more than 81. And the BCH code is overlapped in high level of error correction code. The ECC level is fixed in the size of 7×7.

Fifth step of S717 is blocked the encoded data by the step S707 of encoding processing.

More details of data blocking describes later, refer to FIG. 8.

4. Blocking of Data

Figure 8:
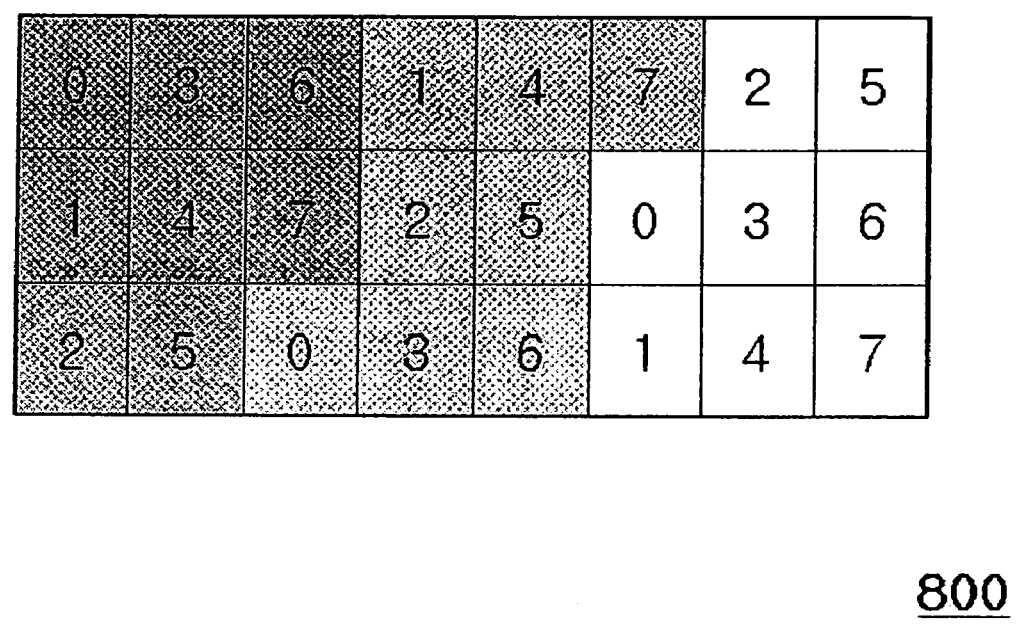

FIG. 8 shows a blocking diagram of encoded data through the processing of FIG. 7.

Data is arranged from left to right based on 24 bits (3 byte) showed in FIG. 8. The BCH code is further arranged to a head of the code in case that total number of cell in data area is more than 81. To make 16 bits (2 byte), remain one bit which is a LSB (least significant bit) is processed to 0 value of bit because the BCH code is 15 bits.

After arranging the BCH code, continuously arrange a pad and ECC codeword from left to right. Remain data is arranged to a next line according to a size of matrix. The codeword is arranged to that order and method, and the last one bit to be remained is processed to 1 bit.

5. Decoding of Data

Figure 9:
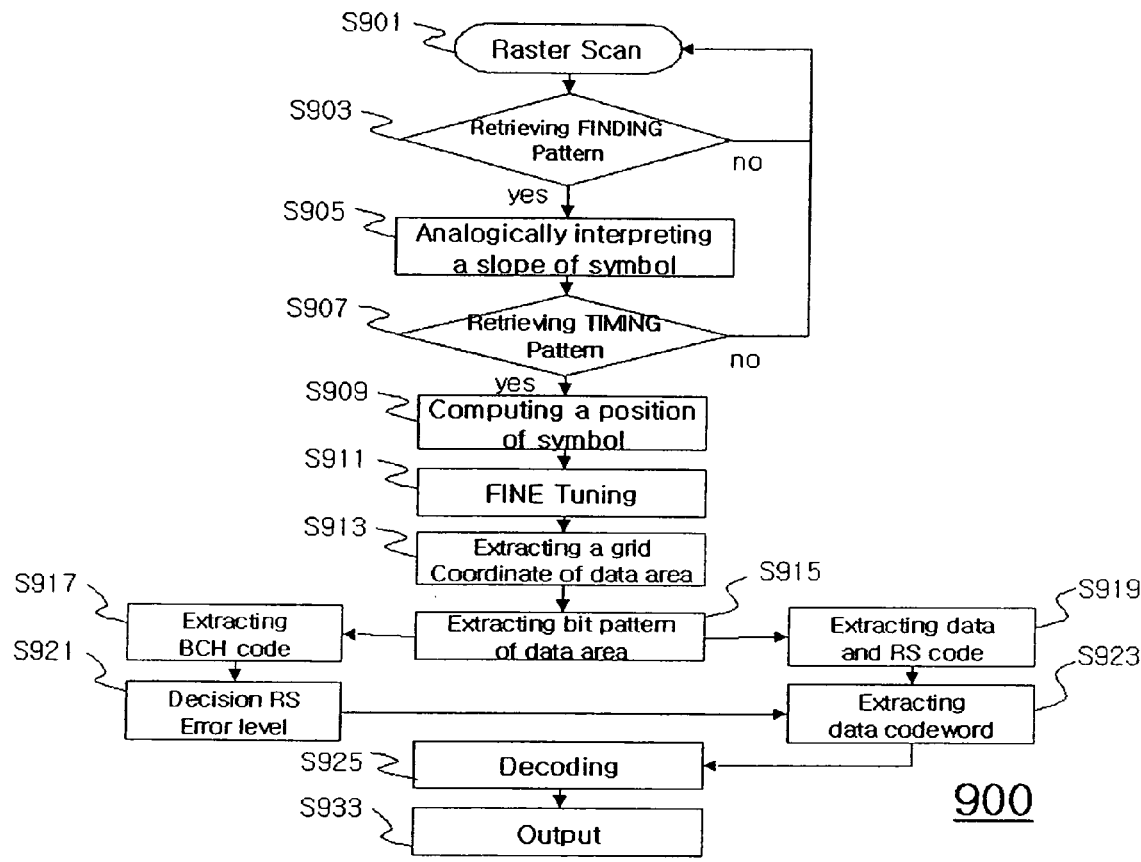
FIG. 9 shows a flow chart of decoding processing.

FIG. 9 shows a flow chart of decoding processing.

First step of S901 is scanning a barcode image using a scanner or camera.

The image scanning of S901 is used to a method of raster scan according to an appropriate embodiment in the present invention. The raster scan is that horizontal raster comprised to a dot or pixel is scanned as if drawing a horizontal line to the code image with line by line drawing from upper to bottom. Another method of vector scanning is that the code image is scanned as if drawing a free line to the code image. So the scanning method is used to any other method according to a system configuration.

Second step of S903 is retrieving for finding pattern through the scanning processing.

The retrieving is that a plurality of horizontal scan line is extracted to the retrieved finding pattern.

If the finding pattern is not retrieved to the horizontal scanning processing, a vertical scan line is extracted to retrieve the finding pattern. Details of the extracting of the scan line describe refer to FIG. 10.

Figure 10:
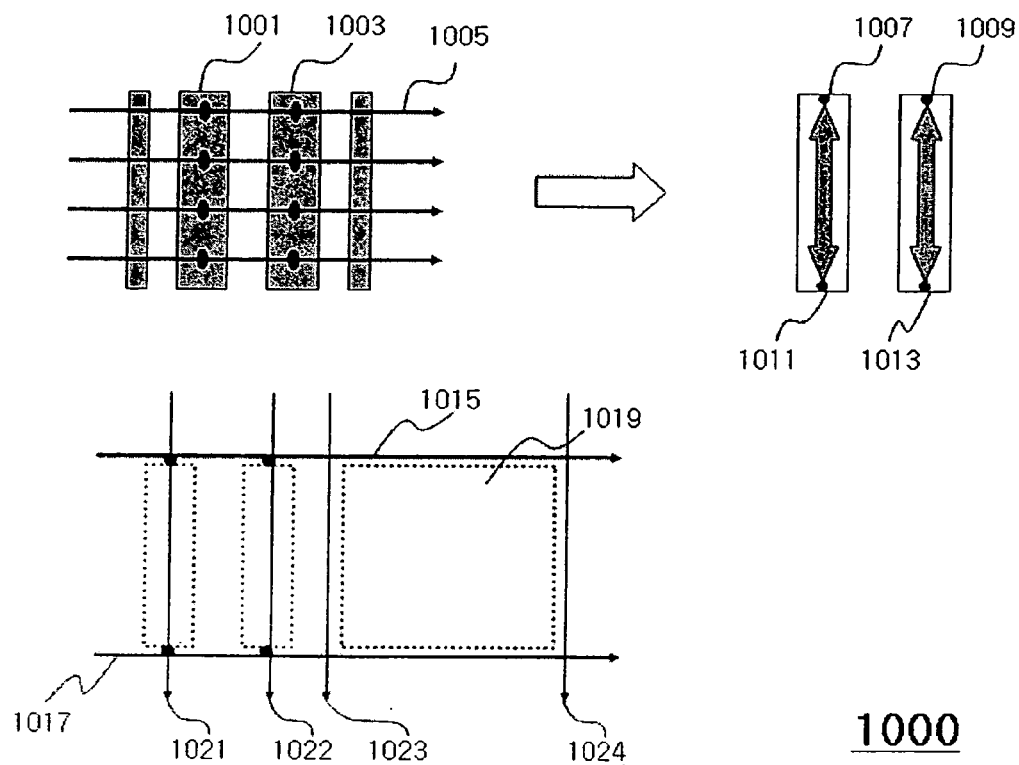
FIG. 10 shows a method of analogically interpretation for slope of total code image through a retrieved finding pattern.

FIG. 10 shows a method of analogically interpretation for slope of total code image through the retrieved finding pattern. The finding pattern must exist two brick bar 1001 and 103 mentioned before. The reason is that central positions of the two brick bar 1001 and 1003 are recorded by means of retrieving the finding pattern in the scanning line 1005, and both end points of 1007, 1009, 1011 and 1013 in two brick bars is retrieved based on the central position.

A slope of the finding pattern 1015 and 1017 is analogically interpreted from the end points of 1007, 1009, 1011 and 1013. And finally a slope of whole symbol is analogically interpreted from the slope of the finding pattern 1015 and 1017 in step S905.

If it fails to retrieve the finding patterns, code image is scanned again.

After the step of S905, timing pattern is retrieving in step S907.

If the timing pattern is retrieved in S907, whole symbol position is computed through above retrieving result in S909.

Through S907 of the retrieved timing pattern, the position and slope of whole symbol is acquired. And, the upside down image and mirror image can be decoded in normal by the retrieved finding pattern and timing pattern.

A step of S911 is a fine tuning of the position and slope of the symbol using finding pattern and timing pattern. In step S911, a number of cells in data area are obtained.

A step of S913 is extracting a grid coordinate of data area by the coordinate based on the position of timing pattern obtained to the step S911.

A step of S915 is extracting a bit pattern in data area that black is 1 bit and white is 0 bit.

A step of S917 is extracting a BCH code from the extracted bit pattern.

A step of S919 is extracting data and RS code from the extracted bit pattern.

A step of S921 is deciding an error level of RS code from the extracted BCH code of S917.

A step of S923 is extracting data codeword from the data and RS code extracted in S919.

A step of S925 is decoding the data codeword.

Finally, through a step of S933 output is printing by the decoding of S925.

6. Level of ECC and Control Method

Figure 11:
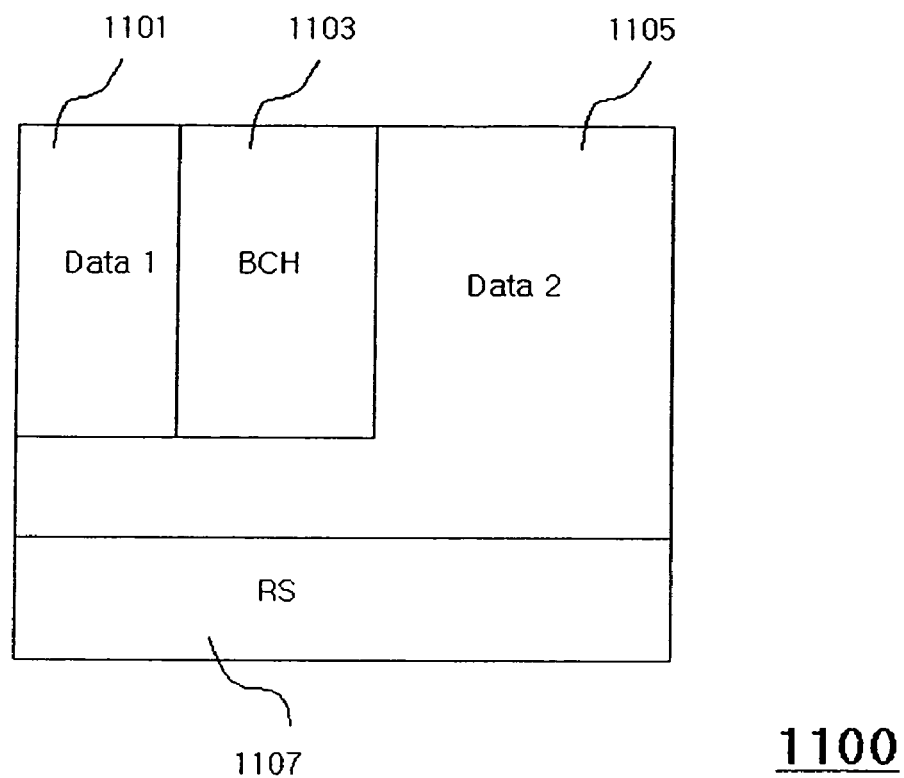
FIG. 11 shows a schematic diagram in data area.

FIG. 11 shows a schematic diagram in data area.

The data area comprises first data code 1101, BCH code 1103, second data code 1105 and RS code 1107, showed in FIG. 11. The BCH code and RS code, showed in FIG. 11, are just an embodiment of the present invention, and another equivalent code can be substitute to the BCH and RS code.

The first data code 1101 and BCH code is recorded on information of error level of RS code 1105, according to FIG. 11.

The objected output data can be decoded from the RS code 1107, by means of deciding an error level through decoding the first data code 1101 and BCH code 1103.

An error probability of data area in decoding processing is different to the quality of input image. The controlling of the quality level in input image is an error level controlling. As the error level is set up high, as the efficiency of error correcting is superior to the level. So, the efficiency of decoding is also superior in proportion to the error level. But an amount of data to be encoded is decrease, as the error level is set up high. That is the error level is in inverse proportion to the amount of data to be recorded.

So, the error level can be set up to consider the objected amount of data. And also consider the configuration to acquire an input image and decoding system. The error level is controlled according to the configuration of providing the barcode image and using the code image in present invention.

INDUSTRIAL APPLICABILITY

According to the present invention, a two-dimensional code having a superior decoding property which is possible to control the level of error correcting codes, and method for encoding and decoding the two-dimensional code are provided. The code of the present invention can be decoded in case of symmetric error or failure to reading the code image due to a blurring or distortion of image.

And more, the control of ECC (Error correction code) is possible according to a configuration.

What is claimed is:

1. A method for decoding of two-dimensional code comprising:
   a step of scanning for physically or electrically code image;
   a step of retrieving for finding pattern through said scanning;
   a step of analogically interpretation for slope of total code image through said retrieved finding pattern;
   a step of retrieving for timing pattern;
   a step of computing a position of said code through said retrieved timing pattern;
   a step of fine tuning for said computed position and slope of code;
   a step of extracting for grid coordinate in data area to use the coordinate formed by said each retrieved timing pattern;
   a step of extracting for bit patterns of said each grid extracted from said grid coordinate in data area;
   a step of extracting for code value from said extracted bit patterns;
   a step of extracting for codeword from said extracted code value; and
   a step of decoding for said extracted codeword.

2. The method for decoding of two-dimensional code claimed in claim 1, wherein said step of extracting for code value comprises
   a step of extracting for BCH code from said bit patterns,
   a step of extracting for data and Reed-Solomon code from said bit patterns, and
   a step of decision for error level of said Reed-Solomon code from said extracted BCH code.

3. The method for decoding of two-dimensional code as claimed in claim 1, wherein said codeword is extracted from said extracted code value and said Reed-Solomon code.

* * * * *

UNITED STATES PATENT AND TRADEMARK OFFICE
CERTIFICATE OF CORRECTION

PATENT NO. : 7,175,088 B2
APPLICATION NO. : 11/451356
DATED : February 13, 2007
INVENTOR(S) : Kyoung-Tae Kim and Dong-Jin Kwon Page 1 of 1

It is certified that error appears in the above-identified patent and that said Letters Patent is hereby corrected as shown below:

On the cover page change the listing of (73) Assignee from

"(73) Assignee: Inconlab, Inc, Gangnam (KR)"

to

-- (73) Assignee: Iconlab, Inc, Gangnam (KR) --

Signed and Sealed this

First Day of May, 2007

JON W. DUDAS
*Director of the United States Patent and Trademark Office*